(12) United States Patent
Chih

(10) Patent No.: US 7,762,504 B2
(45) Date of Patent: Jul. 27, 2010

(54) BASE FOR DISPLAY DEVICE

(75) Inventor: Ting-Hui Chih, Hualien (TW)

(73) Assignee: Qisda Corporation, Taoyuan County (TW)

( * ) Notice: Subject to any disclaimer, the term of this patent is extended or adjusted under 35 U.S.C. 154(b) by 600 days.

(21) Appl. No.: 11/738,395

(22) Filed: Apr. 20, 2007

(65) Prior Publication Data

US 2007/0246619 A1      Oct. 25, 2007

(30) Foreign Application Priority Data

Apr. 21, 2006    (TW) .............................. 95114306 A

(51) Int. Cl.
*A47F 5/00*        (2006.01)
(52) U.S. Cl. ................. 248/125.8; 248/125.2; 248/161; 248/919
(58) Field of Classification Search .............. 248/125.8, 248/161, 157, 917, 919, 463, 125.2
See application file for complete search history.

(56) References Cited

U.S. PATENT DOCUMENTS

| | | | | |
|---|---|---|---|---|
| 4,169,338 A | * | 10/1979 | Eik | 52/118 |
| 5,322,334 A | * | 6/1994 | Hammer | 294/19.1 |
| 6,042,065 A | * | 3/2000 | Benjamin | 248/125.1 |
| 6,056,450 A | | 5/2000 | Walling | |
| 6,177,987 B1 | * | 1/2001 | Ting | 356/148 |
| 7,011,280 B2 | * | 3/2006 | Murray et al. | 248/171 |
| 7,392,969 B2 | * | 7/2008 | Chiu et al. | 248/676 |
| 2003/0025049 A1 | * | 2/2003 | Huang | 248/125.2 |
| 2006/0285363 A1 | | 12/2006 | Chen | |

FOREIGN PATENT DOCUMENTS

| | | |
|---|---|---|
| CN | 1670866 A | 9/2005 |
| TW | I246668 | 1/2006 |
| TW | I274792 | 3/2007 |

* cited by examiner

*Primary Examiner*—J. Allen Shriver, II
*Assistant Examiner*—Bradley H Duckworth

(57) ABSTRACT

A base for a display device. The base comprises a chassis, a rotational element rotatably disposed on the chassis, and an elevator joined to the rotational element. When the rotational element rotates, the elevator moves between a first position and a second position. The rotational element is a cylinder and comprises at least one inclined groove on the periphery of the cylinder. The elevator comprises at least one protrusion engaging the inclined groove. When the rotational element rotates, the protrusion slides in the inclined groove, whereby the elevator moves between the first position and the second position.

15 Claims, 12 Drawing Sheets

BASE FOR DISPLAY DEVICE

BACKGROUND OF THE INVENTION

1. Field of the Invention

The invention relates to a base for a display device.

2. Description of the Related Art

A conventional base for a display device is shown in FIG. 1. The base comprises a connecting element 10 and a chassis 20. The connecting element 10 is joined to the display device (not shown) via two bolt holes 12 on the connecting element 10, and also joined to the chassis 20 via two engaging elements 14 thereon, whereby the display device is supported by the base.

In such a structure, the base has two separate elements, the connecting element 10 and the chassis 20, which, when dissembled, have considerable volume and not easily accommodated.

BRIEF SUMMARY OF INVENTION

An embodiment of a display device of the invention comprises a main body and a base on which the main body is disposed. The base comprises a chassis with a rotational element rotatably thereon, and an elevator joined to the rotational element, wherein when the rotational element rotates, the elevator moves between a first position and a second position.

The rotational element is a cylinder comprising at least one inclined groove on the periphery thereof. The elevator comprises at least one protrusion engaging the inclined groove. When the rotational element rotates, the protrusion slides in the inclined groove, whereby the elevator moves between the first position and the second position. The elevator comprises a flange on which the protrusion is disposed.

The chassis comprises a guide bar and the elevator comprises a guiding portion slidably joined to the guide bar, whereby the elevator moves on the chassis. When the rotational element is joined to the chassis, the guide bar is positioned in the rotational element, and the elevator moves and is accommodated in the rotational element.

The base further comprises a connecting element joined to the display device, rotatably connected to the elevator and accommodated in the rotational element. When the elevator moves to the first position, the connecting element has a predetermined angle with respect to the elevator. When the elevator moves to the second position, the connecting element is accommodated in the rotational element.

The base further comprises an elastic element disposed on the chassis and a link connecting the elastic element and the connecting element, wherein when the elevator moves to the first position, the connecting element has a predetermined angle with respect to the elevator due to the linkage of the elastic element and the connecting element via the link. The connecting point of the link and the connecting element is separated from the connecting point of the connecting element and the elevator by an appropriate distance.

The elastic element is a compressed spring with one end connected to the chassis and the other connected to the link. The elastic element is parallel to a rotational axis of the rotational element.

The base further comprises a plurality of supporting elements equidistantly pivoting on the periphery of the chassis. The supporting elements are rotatable to cover the periphery of the rotational element.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
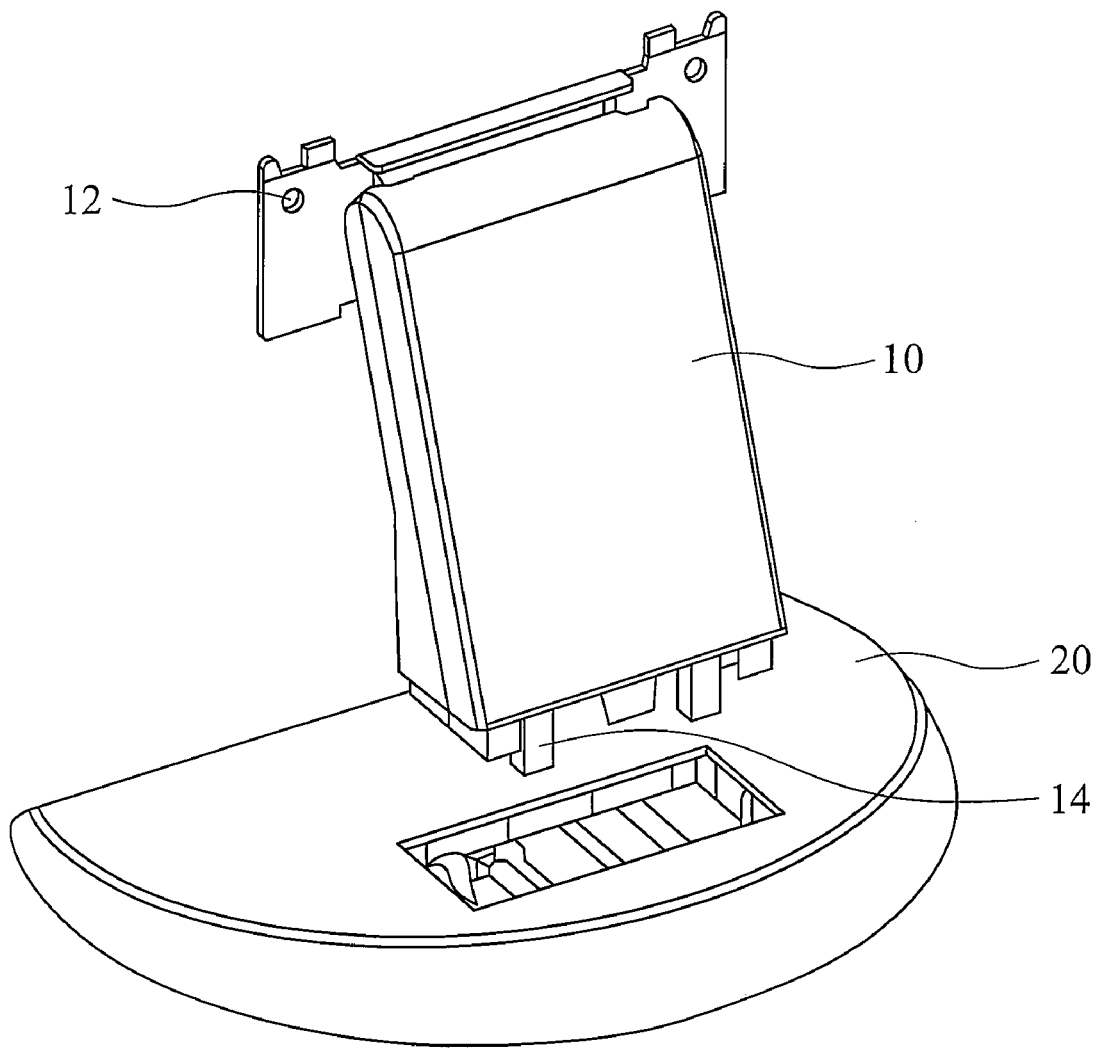
FIG. 1 is a schematic view of a conventional base for a display device.
Figure 2:
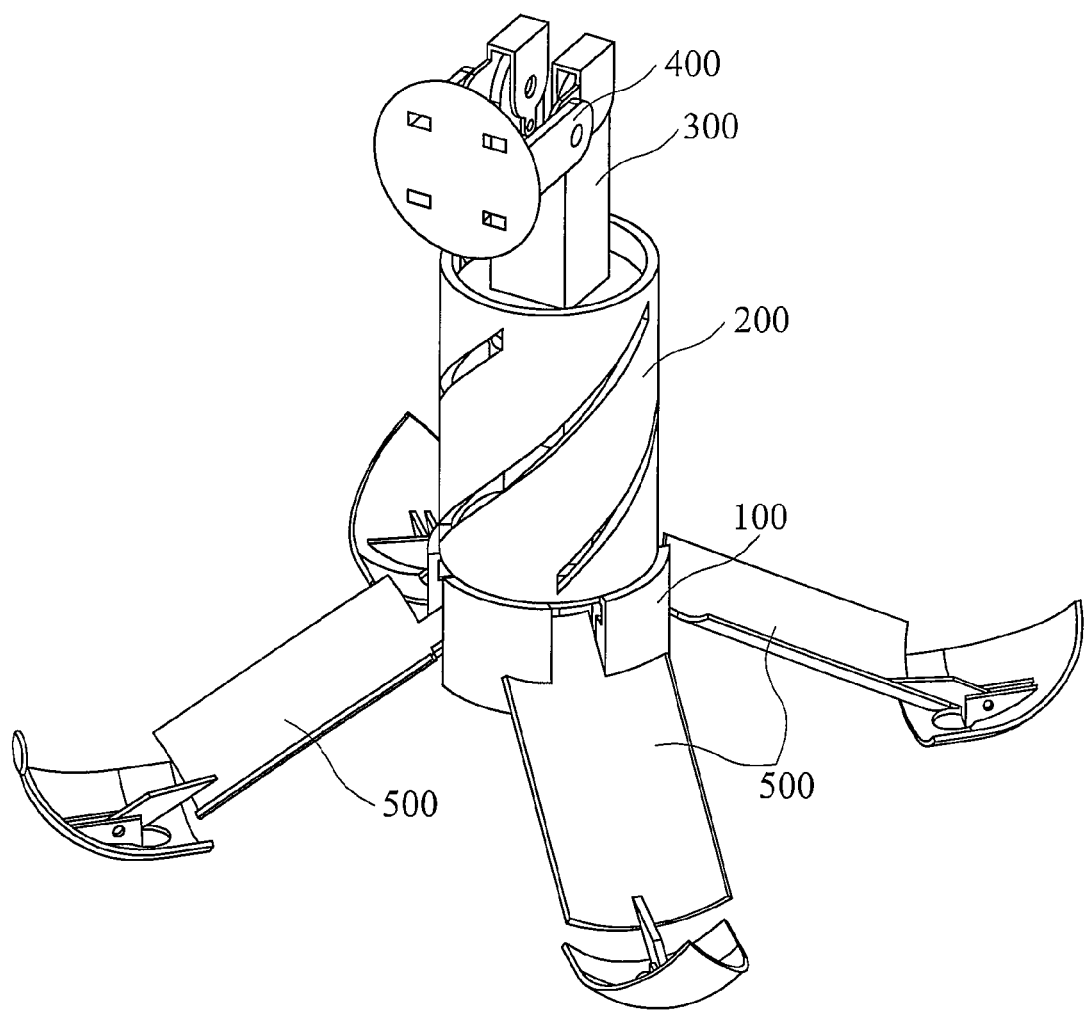
FIG. 2 is a perspective view of an embodiment of a base of the invention.

Referring to FIG. 2, a base 1000 for a display device of the invention comprises a chassis 100, a rotational element 200, an elevator 300, a connecting element 400, a plurality of supporting elements 500, a compression spring (elastic element) 600 and a link 700.

Figure 6A:
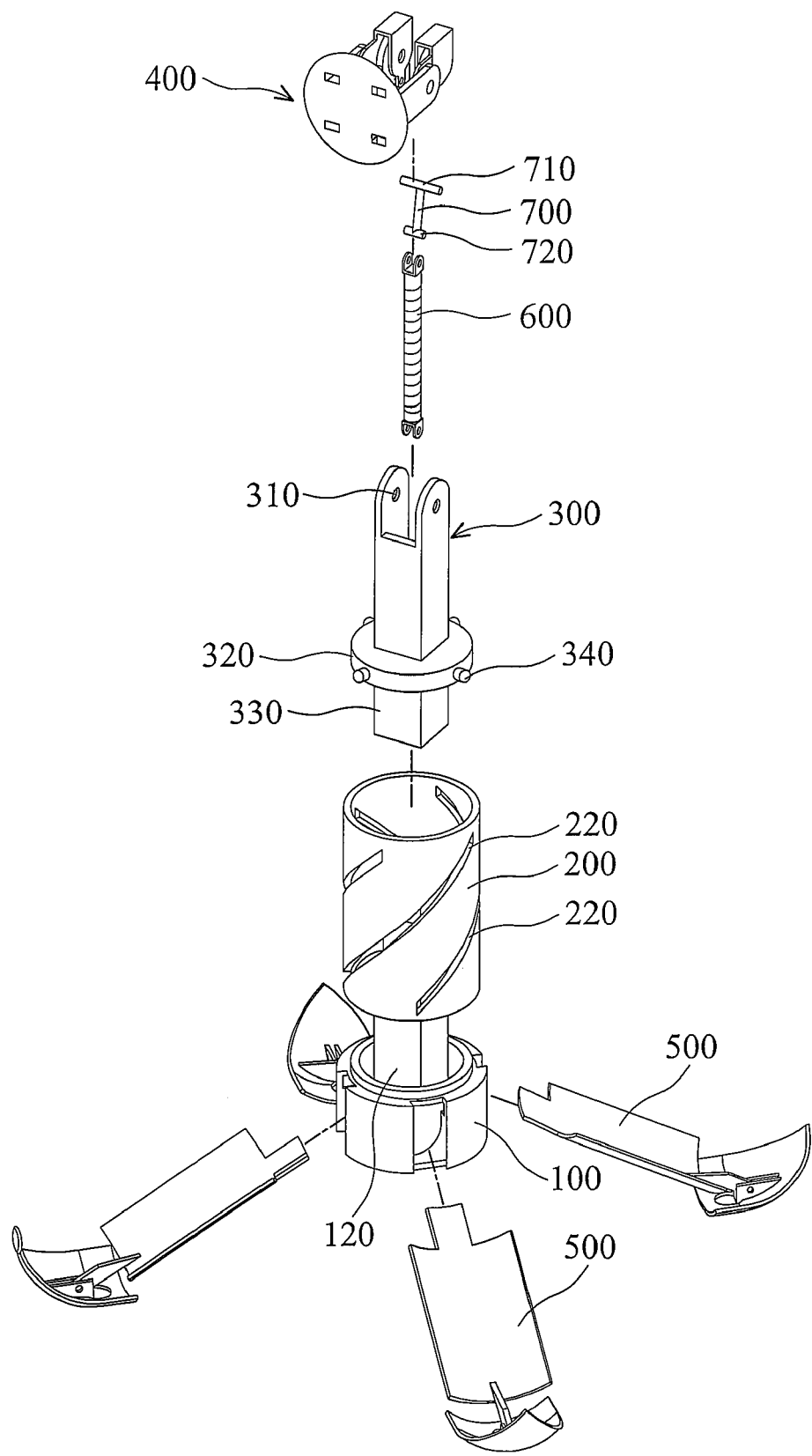
FIGS. 6a and 6b are exploded views of FIG. 2.
Figure 6B:
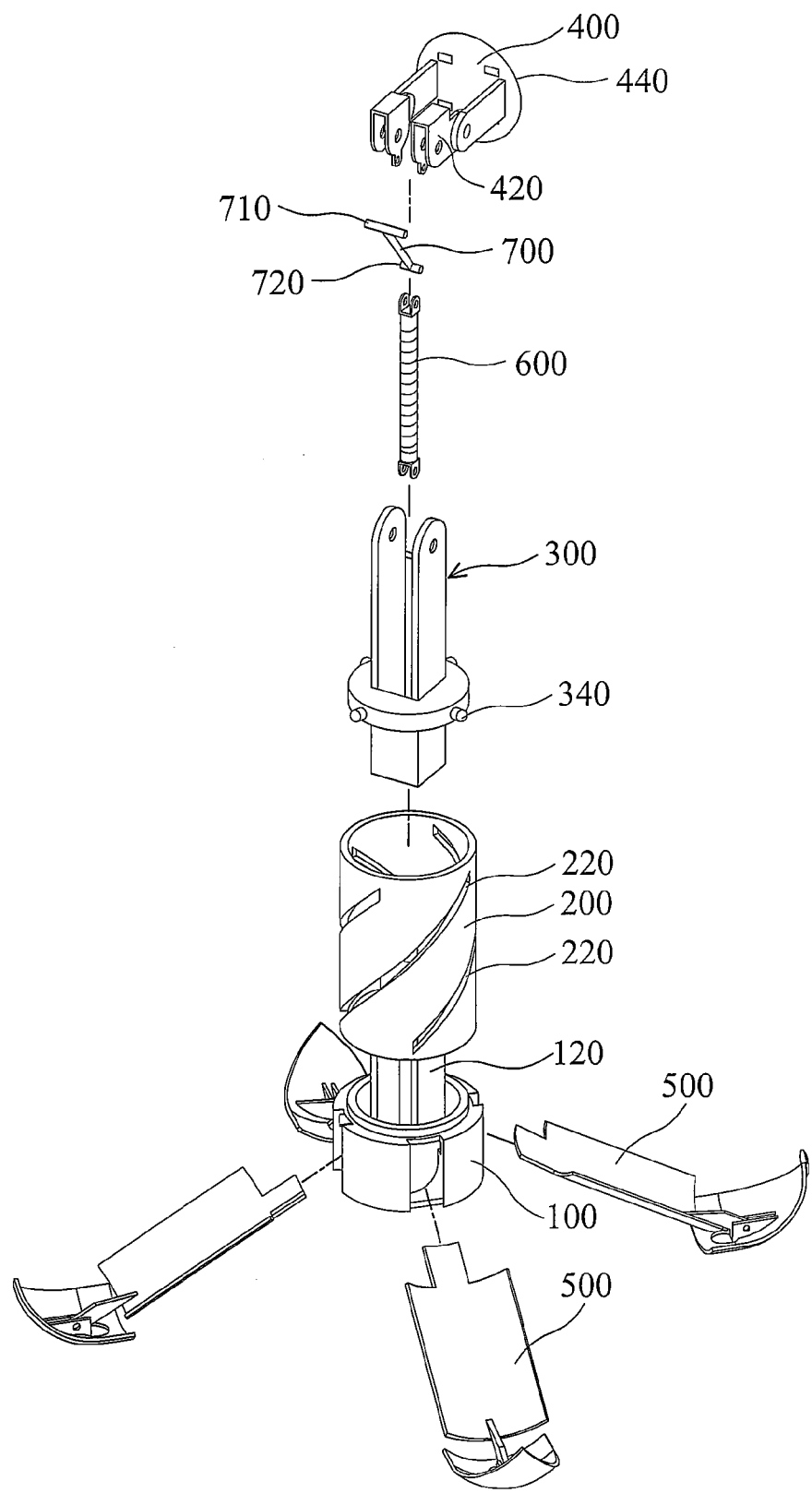

Referring to FIGS. 6a and 6b first, the chassis 100 is substantially a cylinder and has a guide bar 120 extending along the axis of the cylinder.

The rotational element 200 is a hollow cylinder, rotatably joined to the chassis 100, having a plurality of inclined grooves 220 on the periphery of the cylinder.

The elevator 300 comprises a connecting portion 310, a flange 320, a guide portion 330 and a plurality of protrusions 340. The connecting portion 310 is joined to the connecting element 400. The guide portion 330 is slidably disposed in the guide bar 120 and capable of moving up and down along the guide bar 120. The protrusions 340 project radially from the circular flange 320 and engage the inclined grooves 220. When the rotational element 200 rotates, the protrusions 340 slide in the inclined grooves 220, whereby the elevator 300 is able to move up to a first position or down to a second position. FIG. 2 depicts the elevator 300 moving up to the first position.

Figure 3:
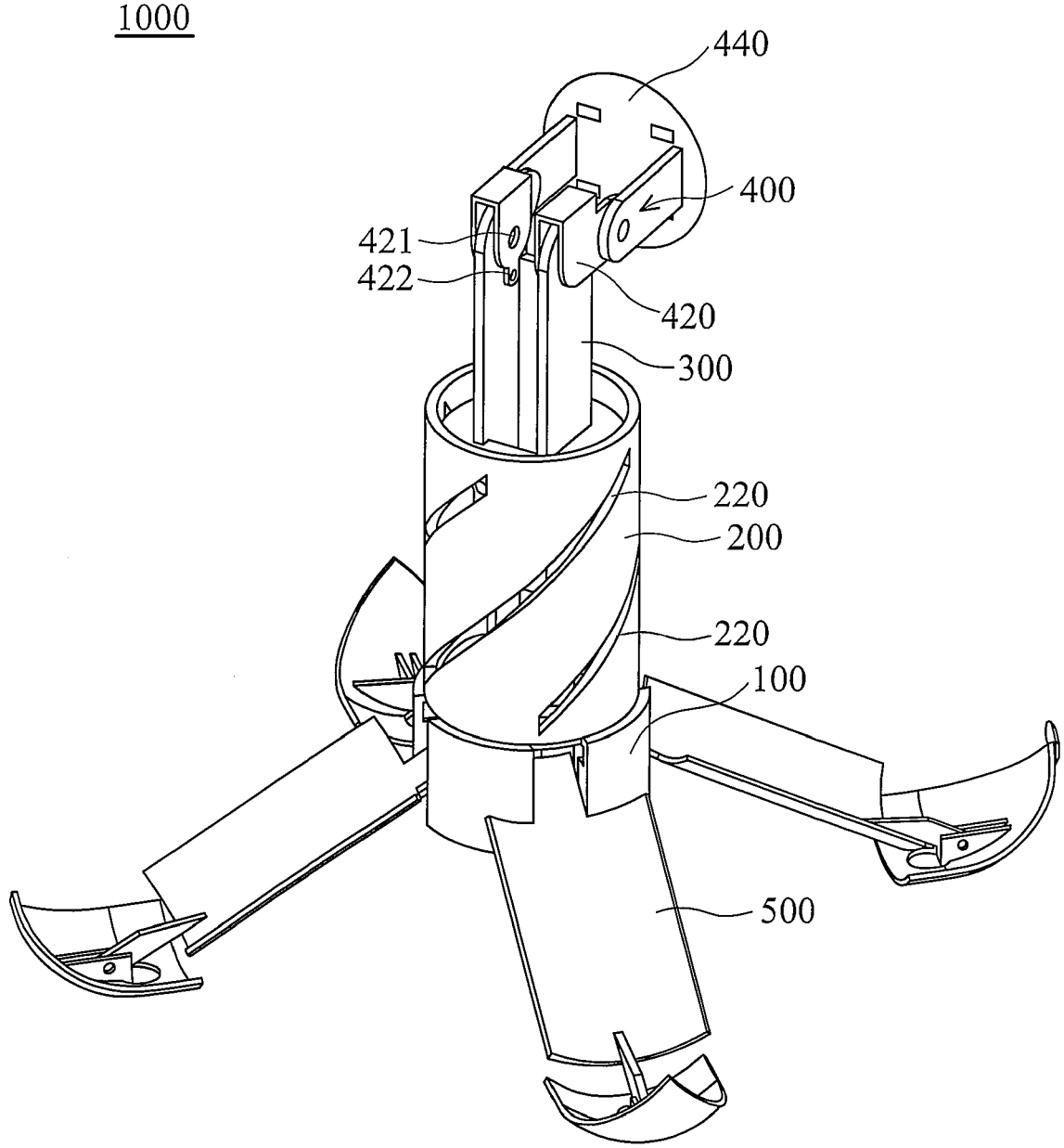
FIG. 3 is another perspective view of the embodiment of FIG. 2.
Figure 4:
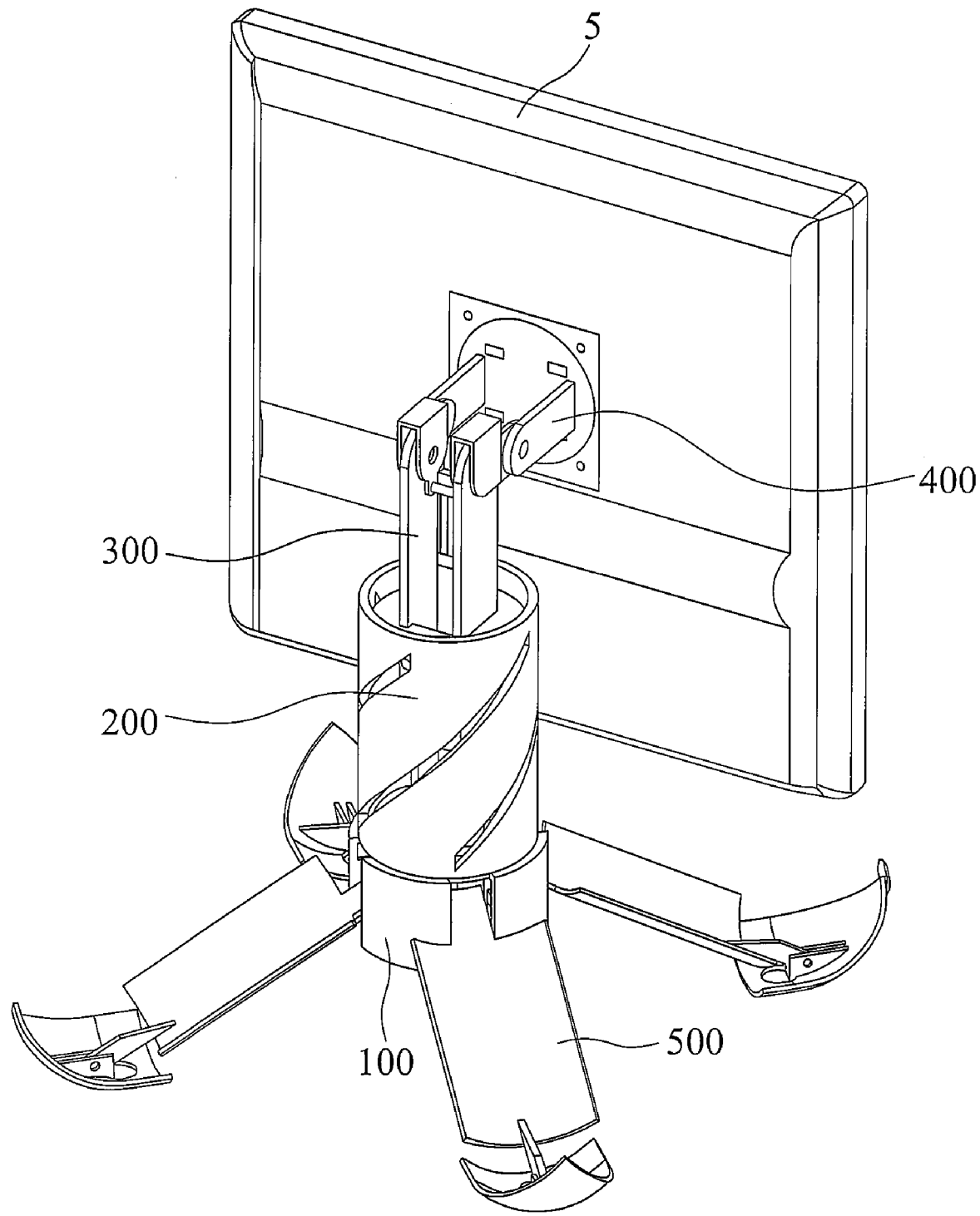
FIG. 4 is a perspective view of the base of the invention assembled to a display device.

Referring to FIG. 6b, the connecting element 400 comprises a pivot portion 420 and a joining portion 440. The pivot portion 420 pivots on the connecting portion 310 of the elevator 300. The joining portion 440 is joined to a display device 5 as shown in FIG. 4. The pivot portion 420 has a first hole 421 and a second hole 422 separated from the first hole 421 by a appropriate distance as shown in FIG. 3. The pivot portion 420 pivots on the connecting portion 310 via the first hole 421 and rotates around the first hole 421 relative to the connecting portion 310. The second hole 422 is provided for the link 700 to connect the pivot portion 420.

Figure 5:
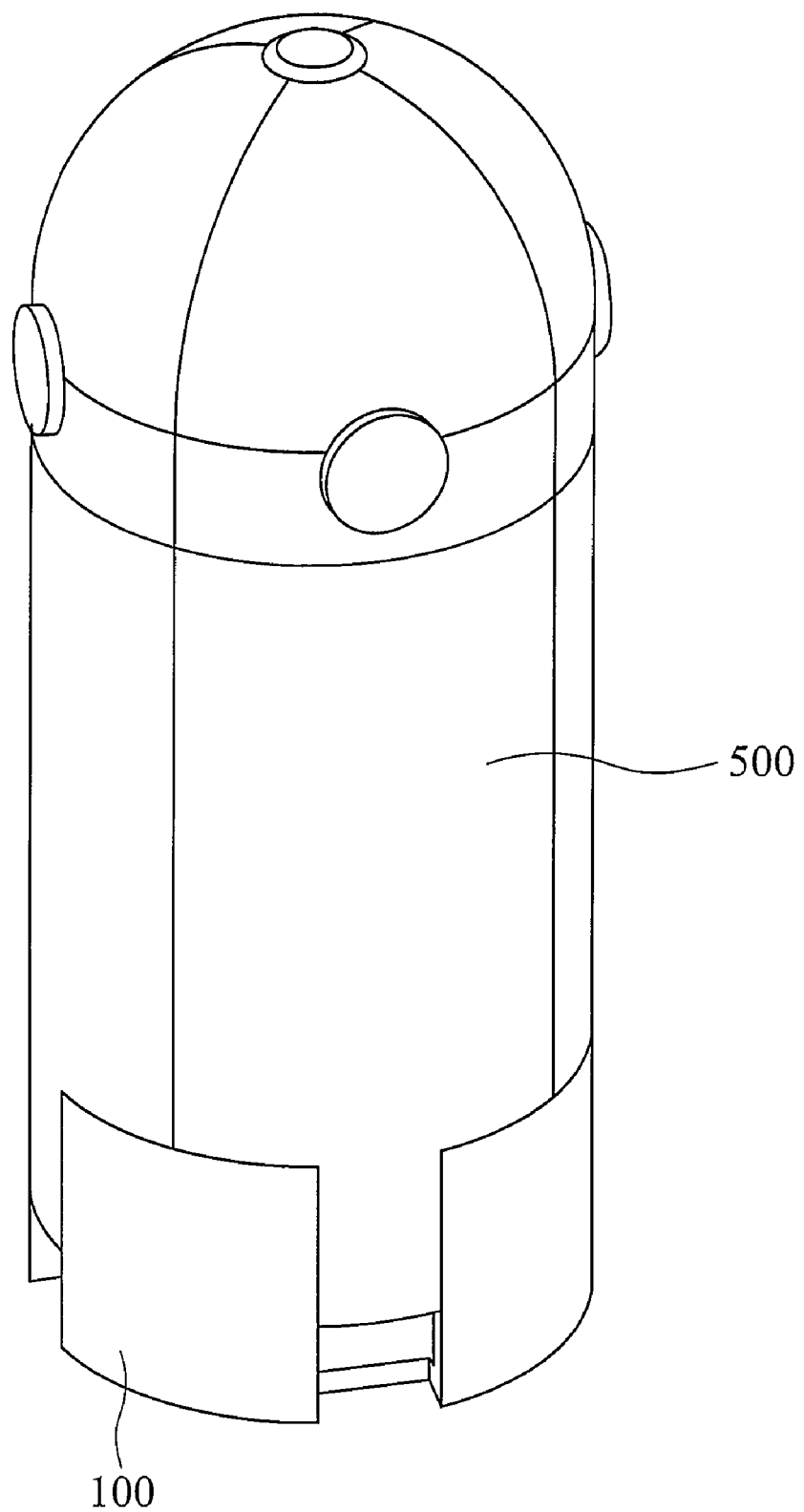
FIG. 5 is a perspective view of the base with supporting elements covering the rotational element.

The supporting elements 500 equidistantly pivot on the periphery of the chassis 100. The supporting elements 500 are capable of rotating to cover the periphery of the rotational element 200 and act as a housing of the base 1000, as shown in FIG. 5.

As shown in FIGS. 6a and 6b, one end of the compression spring 600 is joined to the chassis 100 and positioned in the rotational element 200, and the other end extends along the axis of the rotational element 200 and connects to the link 700.

The link 700 has a first end 710 and a second end 720. The first end 710 pivots on the second hole 422 of the connecting element 400. The second end 720 is connected to the other end of the compression spring 600.

The compression spring 600 is fixed to the chassis 100, the link 700 rotatably connected to the compression spring 600 and the connecting element 400 respectively, and the connecting element 400 is joined to the elevator 300. When the elevator 300 moves up or down, the connecting element 400 is moved up or down by the elevator 300 and the first end 710 of the link 700 (connected to the connecting element 400) is rotated relative to the second end 720 (connected to the compression spring 600), whereby the connecting element 400 is rotated around the first hole 421 to provide a desired angle between the connecting element 400 and the elevator 300.

The motion of the base 1000 is described with reference to FIGS. 7a to 7j as follows.

Figure 7A:
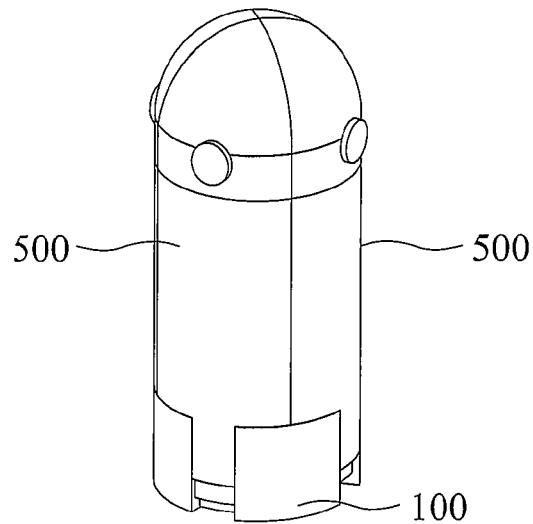
FIGS. 7a to 7d depict supporting elements extended.
Figure 7B:
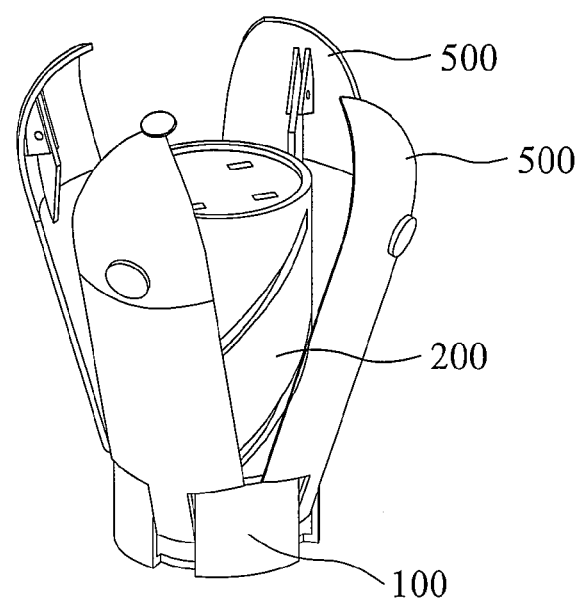
Figure 7C:
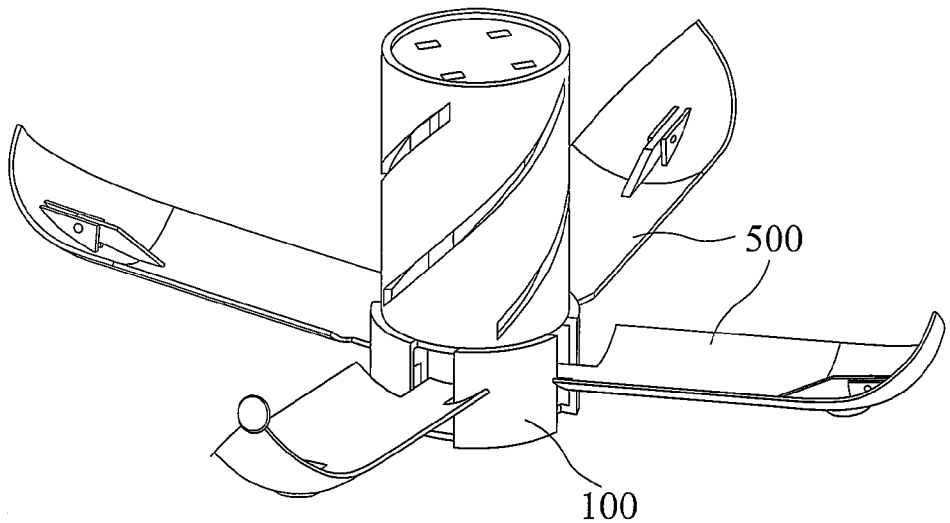
Figure 7D:
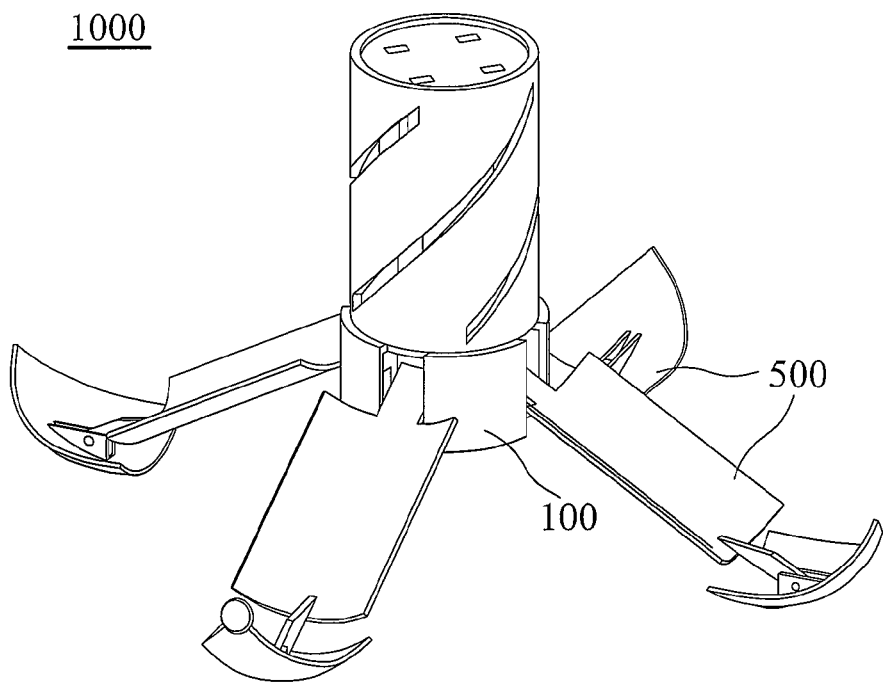

Referring to FIG. 7a, the supporting elements 500 cover the periphery of the rotational element 200 to act as a housing of the base 1000. In FIGS. 7b and 7c, the supporting element 500 is rotated gradually and extended to an appropriate position to support the base 1000.

Figure 7E:
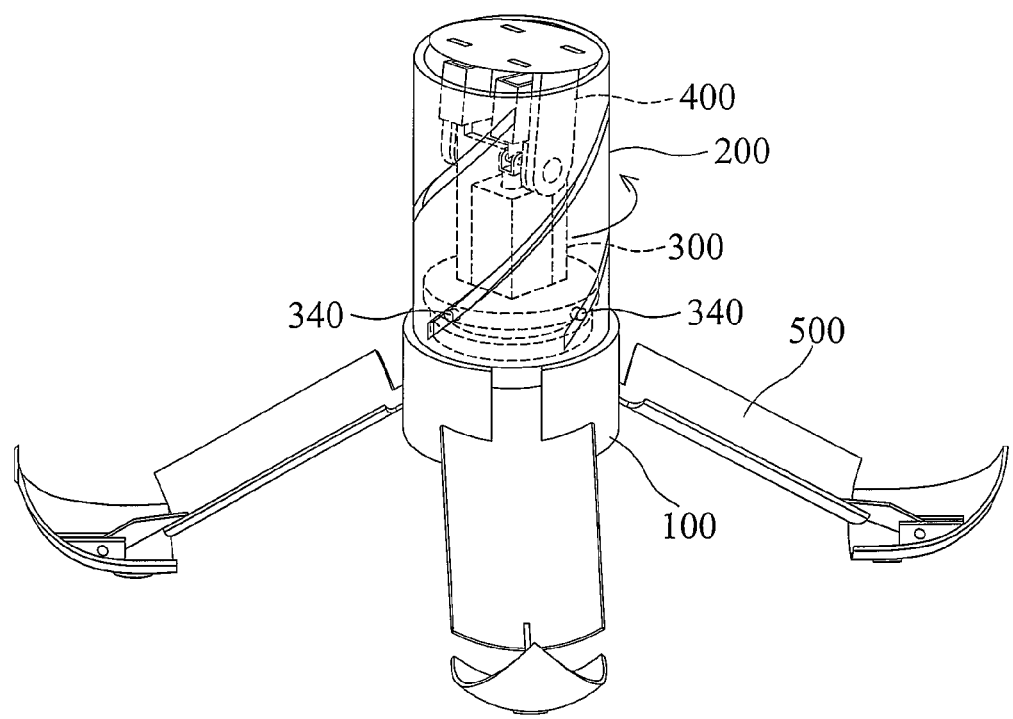
FIGS. 7e to 7j depict the rotational element rotating to enable the connecting element to be used.

FIGS. 7e to 7j depict the rotational element 200 is rotating in the direction of the arrow in FIG. 7e, whereby the elevator 300 rises, and the connecting element 400 moves out of the rotational element 200 and finally has a predetermined angle relative to the elevator 300.

Figure 7F:
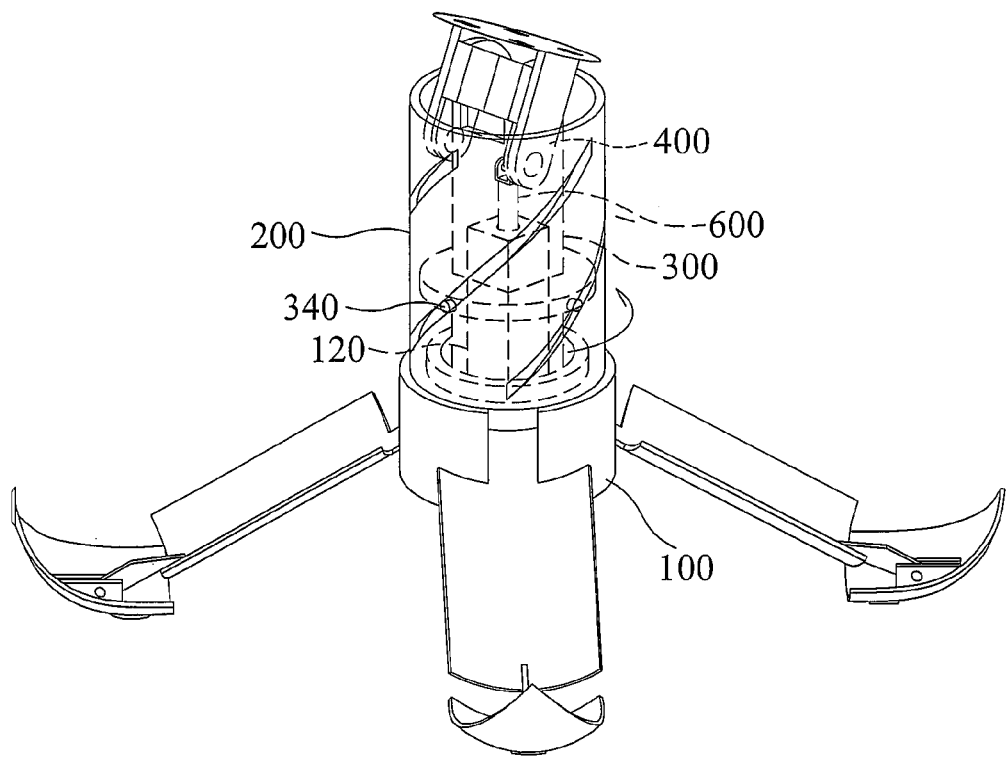
Figure 7G:
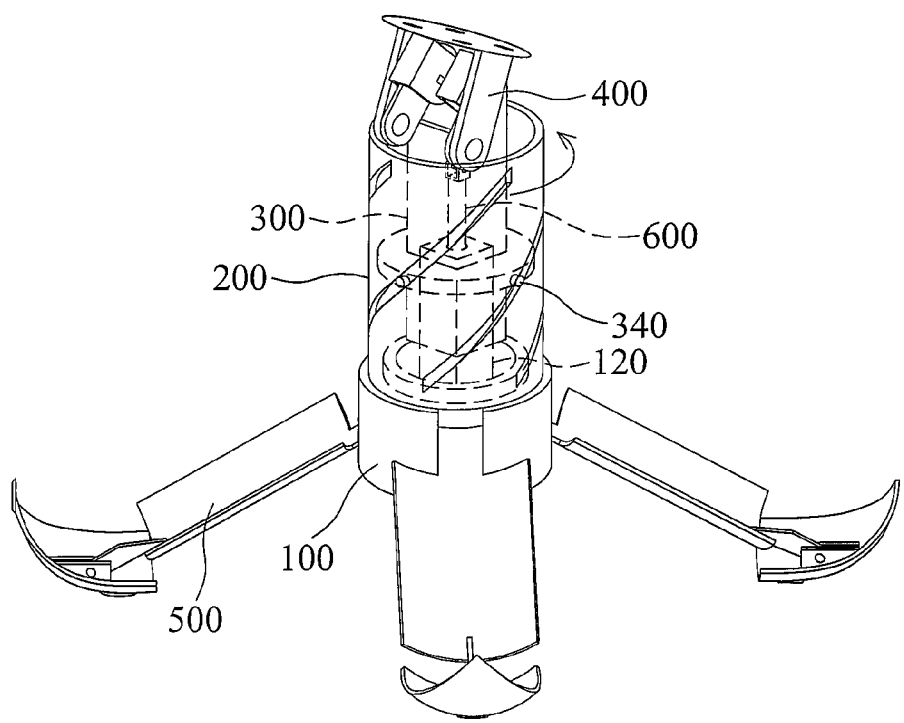
Figure 7H:
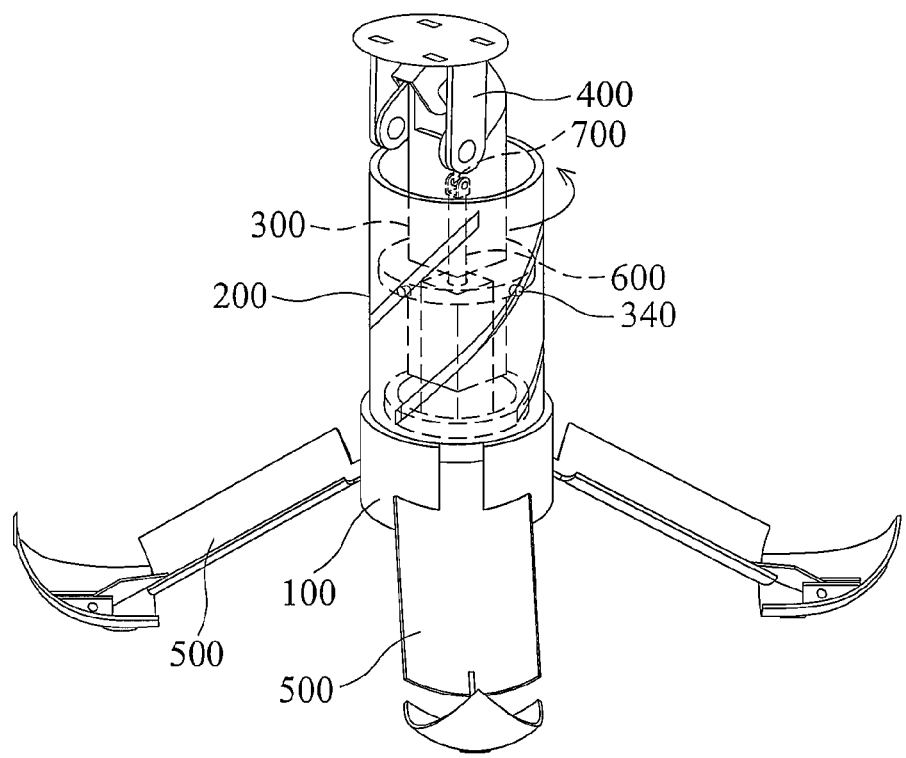
Figure 7I:
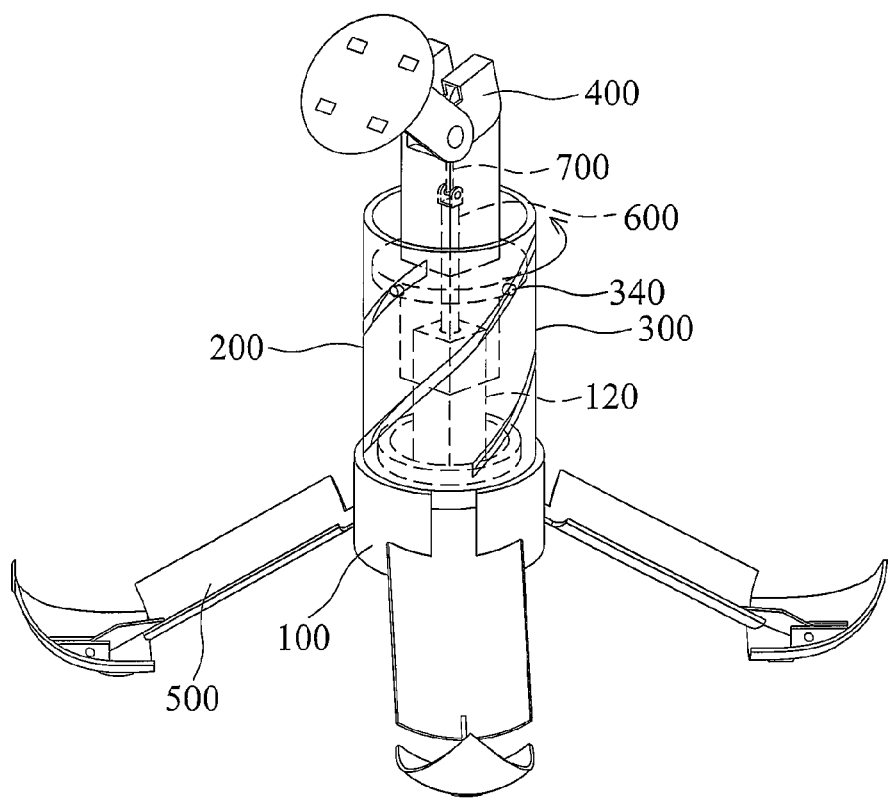
Figure 7J:
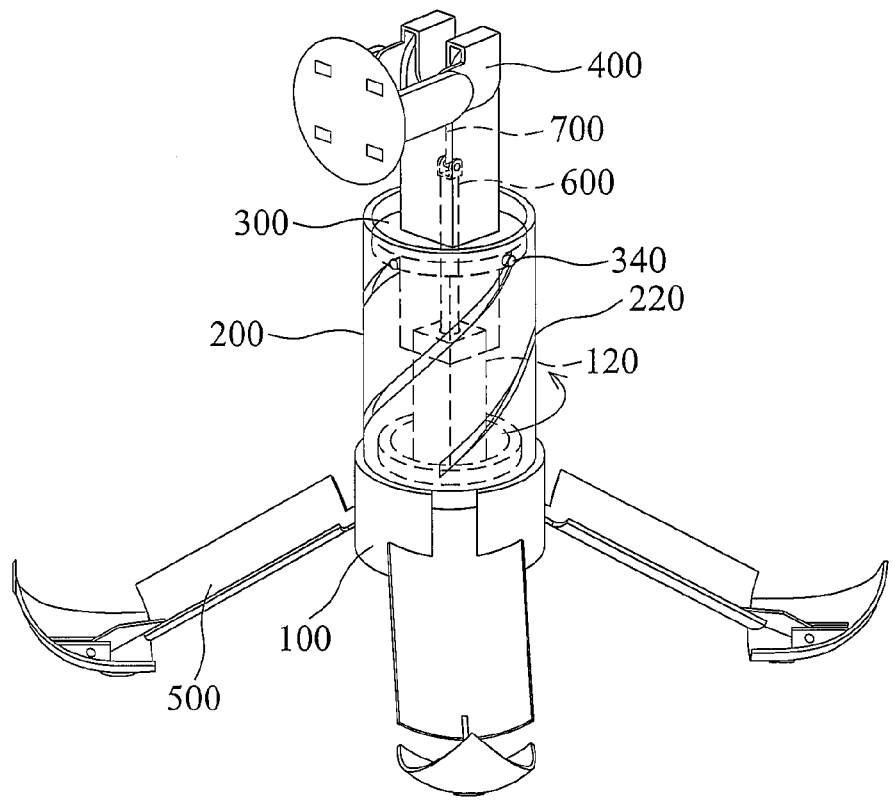

In FIG. 7e, the rotational element 200 rotates to move the protrusion 340 along the inclined grooves 220. At this time, the elevator 300 move up along the guide bar 120, and the compressed compression spring 600 is released gradually. The potential of the compression spring 600 moves the link 700, whereby the connecting element 400 moves up with the elevator 300 and rotates clockwise a small angle as shown in FIGS. 7f and 7g. The elevator 300 continues rising, and the connecting element 400 rotates counterclockwise to a vertical position, as shown in FIG. 7h. At this time, the potential of the compression spring 600 is released completely. The elevator 300 continues rising, the compression spring 600 is pulled, and the potential of the compression spring 600 pulls the link 700 to rotate the connecting element 400 counterclockwise to the predetermined angle, as shown in FIGS. 7i and 7j. At this time, the display device 5 can be joined to the joining portion 440 of the connecting element 400.

The rotational element 200 can be rotated to move the elevator 300 down and accommodate the connecting element 400 in the rotational element 200. Similarly, the rotational element 200 can be rotated to move the elevator 300 up to rotate the connecting element 400 to a predetermined angle with respect to the elevator 300, whereby the display device is easily joined thereto. The supporting elements 500 can cover the periphery of the rotational element 200 when the base 1000 is not in use. The base 1000 occupies a considerably small space when not in use.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A base for a display device, comprising a chassis comprising a guide bar;
a rotational element rotatably disposed on the chassis, being a cylinder and comprising at least one inclined groove on the periphery of the cylinder; and
an elevator joined to the rotational element and comprising least one protrusion engaging the inclined groove, and a guiding portion slidably joined to the guide bar, thereby the elevator moving on the chassis, wherein when the rotational element rotates, the elevator moves between a first position and a second position, and the protrusion slides in the inclined groove, whereby the elevator moves between the first position and the second position.

2. The base as claimed in claim 1, wherein the elevator comprises a flange on which the protrusion is disposed.

3. The base as claimed in claim 1, wherein when the rotational element is joined to the chassis, the guide bar is positioned in the rotational element, and the elevator moves in the rotational element and is accommodated in the rotational element.

4. The base as claimed in claim 1 further comprising a connecting element rotatably connected to the elevator and accommodated in the rotational element, wherein when the elevator moves to the first position, the connecting element has a predetermined angle with respect to the elevator, and when the elevator moves to the second position, the connecting element is accommodated in the rotational element.

5. The base as claimed in claim 4 further comprising an elastic element disposed on the chassis and a link connecting the elastic element and the connecting element, wherein when the elevator moves to the first position, the connecting element has the predetermined angle with respect to the elevator due to the linkage of the elastic element and the connecting element via the link.

6. The base as claimed in claim 5, wherein the connecting point of the link and the connecting element are separated from the connecting point of the connecting element and the elevator by a distance.

7. The base as claimed in claim 5, wherein the elastic element is a compressed spring with one end connected to the chassis and the other end connected to the link.

8. The base as claimed in claim 7, wherein the elastic element is parallel to a rotational axis of the rotational element.

9. The base as claimed in claim 1 further comprising a plurality of supporting elements equidistantly pivoting on the periphery of the chassis.

10. The base as claimed in claim 9, wherein the supporting elements are rotatable to cover the periphery of the rotational element.

11. A display device, comprising:
a main body; and
a base on which the main body is disposed, the base comprising:
a chassis comprising a guide bar;
a rotational element rotatably disposed on the chassis, being a cylinder and comprising at least one inclined groove on the periphery of the cylinder; and
an elevator joined to the rotational element and comprising least one protrusion engaging the inclined groove, and a guiding portion slidably joined to the guide bar, thereby the elevator moving on the chassis, wherein when the rotational element rotates, the elevator moves between a first position and a second position, and the protrusion slides in the inclined groove, whereby the elevator moves between the first position and the second position.

12. The display device as claimed in claim 11, wherein when the rotational element is joined to the chassis, the guide bar is positioned in the rotational element, and the elevator moves in the rotational element and is accommodated in the rotational element.

13. The display device as claimed in claim 11 further comprising a connecting element joined to the main body, rotatably connected to the elevator and accommodated in the rotational element, wherein when the elevator moves to the first position, the connecting element has a predetermined angle with respect to the elevator, and when the elevator moves to the second position, the connecting element is accommodated in the rotational element.

14. The display device as claimed in claim 13 further comprising an elastic element disposed on the chassis and a link connecting the elastic element and the connecting element, wherein when the elevator moves to the first position, the connecting element has the predetermined angle with respect to the elevator due to the linkage of the elastic element and the connecting element via the link.

15. The display device as claimed in claim 14, wherein the connecting point of the link and the connecting element are separated from the connecting point of the connecting element and the elevator by a distance.

* * * * *